(12) United States Patent
O'Brien

(10) Patent No.: US 9,390,558 B2
(45) Date of Patent: Jul. 12, 2016

(54) FAUX-TRANSPARENCY METHOD AND DEVICE

(76) Inventor: Denis R. O'Brien, Vancouver (CA)

( * ) Notice: Subject to any disclaimer, the term of this patent is extended or adjusted under 35 U.S.C. 154(b) by 2490 days.

(21) Appl. No.: 12/157,888

(22) Filed: Jun. 12, 2008

(65) Prior Publication Data

US 2008/0310675 A1    Dec. 18, 2008

Related U.S. Application Data

(60) Provisional application No. 60/963,192, filed on Aug. 3, 2007.

(51) Int. Cl.
| | |
|---|---|
| *G09G 5/00* | (2006.01) |
| *G06K 9/36* | (2006.01) |
| *G06T 19/00* | (2011.01) |
| *G06T 3/40* | (2006.01) |
| *G09G 5/14* | (2006.01) |
| *G06T 15/00* | (2011.01) |

(52) U.S. Cl.
CPC .............. *G06T 19/00* (2013.01); *G06T 3/4038* (2013.01); *G06T 15/00* (2013.01); *G09G 5/14* (2013.01); *G06T 2210/62* (2013.01)

(58) Field of Classification Search
CPC ................................ G09G 5/14; G06T 3/4038
USPC .................................. 345/629–641; 382/284
See application file for complete search history.

(56) References Cited

U.S. PATENT DOCUMENTS

| | | | | |
|---|---|---|---|---|
| 5,307,162 A | * | 4/1994 | Schowengerdt | H04N 7/18 348/122 |
| 6,333,726 B1 | * | 12/2001 | Bettinger | 345/87 |
| 2002/0117605 A1 | * | 8/2002 | Alden | 250/208.1 |
| 2007/0190368 A1 | * | 8/2007 | Jung | F41H 3/00 |

* cited by examiner

*Primary Examiner* — Ke Xiao
*Assistant Examiner* — Andrew Shin
(74) *Attorney, Agent, or Firm* — Denis R. O'Brien

(57) ABSTRACT

A method and a device for producing faux-transparency of an object are disclosed and claimed wherein an ikon display device (IDD) is interposed between a viewer and object, which obstructs a background view from the viewer, and wherein an ikon acquiring device (IAD) acquires an ikon of the background, and wherein the ikon of the background is displayed by the IDD. The invention includes means and methods for editing the background ikon to produce an occluding background icon (OBI), which is a representation of the portion of the background view obstructed by the object, wherein the OBI is displayed by the IDD and the viewer sees the OBI instead of the object.

6 Claims, 10 Drawing Sheets

FAUX-TRANSPARENCY METHOD AND DEVICE

BACKGROUND OF THE INVENTION

Field of the Invention

The field of the invention comprises devices and methods for rendering an object invisible to a viewer.

LIST OF ABBREVIATIONS

The following abbreviations are used in the disclosures and claims.
DVD—Digital Video Disc
EM—Electromagnetic
IAD—Ikon Acquisition Device
ICE—Ikon Computation and Editing
IDD—Ikon Display Device
IR—Infra-red
LED—Light-emitting Diode
LsVD—Large-scale Video Device
OBI—Obscured Background Ikon
SsVD—Small-scale Video Device
Definitions of Certain Terms The following definitions are provided in order to set forth the intended scope and meaning of certain terms used in this disclosure and in the claims. Examples used in the definitions are intended to illustrate and clarify definitions, and not to limit the definition or the scope of the term. The terms defined here include plural forms, singular forms, and grammatical congeners and alternatives.

"Faux-transparency" and "simulated transparency"—used interchangeably to refer to a phenomenon produced by the instant invention in which photons appear to pass through an object, when, in fact, they do not.

"Transparatize"—the process of producing faux-transparency in or of an object. The adjective "transparatized" refers to an object that has been rendered faux-transparent by the means and methods disclosed herein.

"Image"—the impression made upon the viewer's visual system. Unless modified the term image is intended to broadly include still images, video images, digital images, analog images, UV images, IR images, and combinations thereof.

"Ikon"—a data representation of an image. Thus, the terms "image" and "ikon" are used to distinguish that which is seen (image) from a data representation (ikon) of that which is seen.

The term "viewer" is used herein in its broadest sense to include animate and inanimate entities capable of acquiring and processing an image. Cameras, both still and video, are "viewers" within the scope of the invention. For clarity of expression, "viewer" is exemplified herein as a human viewer. However, it is to be understood that such anthropocentric terminology is used to facilitate comprehension of the disclosure and not to limit the scope of the claims.

"Visible" is defined with respect to the capacities of the viewer and includes all portions of the electromagnetic ("EM") spectrum that can be detected by the viewer. It thus includes, by example, the infra-red portion of the spectrum in the case of a viewer that is an IR detector. Although the examples disclosed are described with respect to visible EM radiations, upon consideration of this disclosure it will be immediately evident that the means and methods disclosed are more generally applicable to the entire EM spectrum.

"Occluding object"—an object (or objects) that occludes part of a vista or view from the viewer. The term "nulled object" refers to the occluding object that has been, or is intended to be, transparatized. The nulled object may be a moving object, such as an aircraft, ship, or land vehicle, or it may be a fixed and stationary object, such as a building or water-tower or even a group of buildings. The specific nulled objects discussed below are chosen for their heuristic value and not as limitations of the invention. The terms "object," "occluding object," "transparatized object," "nulled object," and the like refer to an entire object or to a relevant portion of an object.

"Viewer distal side"—the surface or side of the nulled object facing away from the viewer, or toward the background. Conversely, "viewer-proximal side" or "visible side" of a nulled object refers to that surface or side of the nulled object that facing toward the viewer. In the interest of clarity, arbitrary references to compass directions are used to clarify direction. Such references to north, south, east, and west are provided only for heuristic purposes and are not intended to limit the invention.

"Total background"—the entire view that a viewer would see but for an occluding object. "Occluded background" refers to the specific portion of a total background that is occluded from a viewer's view by the occluding object. "Occluded Background Ikon" (OBI) refers to a data representation of the occluded background. "Visible Background" refers to that portion of the total background that is not occluded from the viewer's view by the occluding object. Total background=occluded background+visible background.

The term "portion" optionally includes the whole in the sense that, by way of example, producing faux-transparency in a portion of an object includes the option of producing faux-transparency in the whole object. The term is useful, and is used, because in some circumstances it is desirable to apply the invention to only part of the occluding object, for instance, the top half of a tall building. The use of the term "portion" is therefore not intended to limit the invention, nor is it intended to obviate the application of the invention to entire buildings or other occluding objects in their entirety.

The foregoing terms may be more fully understood by referring to FIG. 1, which shows the relationship of a viewer 101 to an occluding object 201 and a background. The viewer-proximal side of object 201 is indicated by the "x" and the viewer-distal side of object 201 is indicated by the 'y." The total background relative to object 201 would include all entities behind 201 with respect to viewer 101. That is, all entities that would be seen by the viewer 101 but for object 201, which includes all background entities that lie within the viewer's field of vision, represented by reference lines 901 and 601, subtended by angle "a." These background entities are represented as clouds 301, 401 and 501 and, of course, the sky. Object 201 occludes a portion of this total background, namely those clouds lying in the viewer's visual field but between reference lines 701 and 801, i.e., occupying the volume beyond 201 subtended by angle "b." Hence, the "occluded background" includes cloud 401 and a portion of cloud 301. An ikon of just the occluded background, acquired, for instance, by a camera positioned at "y" and appropriately cropped and zoomed with respect to viewer 101, is referred to herein as an "Occluded Background Ikon" or "OBI."

The "visible background" consists of that part of the background visible to viewer 101, e.g. entities lying between reference lines 601 and 701, and between reference lines 801 and 901. The only entities in the visible background are cloud

501, part of cloud 301, and the sky. It is to be noted that the sky is classified as an "entity" herein because it is an important component of most background images.

"North," "East," "South," and "West" are employed herein merely to provide a reference-frame for describing relative directions of view or movement. The terms are not used to indicate absolute geographical direction.

"Ikon Acquisition Device" (IAD)—a device, or combination of devices, that acquires an image and converts it to an ikon, i.e, data representation. Digital still cameras and digital video cameras that produce a digital output of an image are examples of IADs. A video camera system that produces an analog output combined with a means for converting the analog output to a data representation is also an example of an IAD.

"Ikon Display Device" (IDD)—a device, or a system of devices, that displays an ikon acquired by an IAD, optionally after the ikon has been zoomed, cropped, or otherwise edited for display. The type display system preferred is transmission-type displays such as video systems that acquire a digital image and transmit the image from a flat LCD or LED screen or matrix of screens, as disclosed in detail below. The method of the invention also easily accommodates reflective display devices of the type that project an ikon onto a reflective surface. Such reflective display devices may be adequate for low-level uses, but given the present state of the technology, reflective display devices are generally not preferred.

"Interpose"—when used with respect to an IDD or with respect to an ikon displayed by an IDD means positioning the IDD between the viewer and the nulled object such that an ikon displayed by the IDD is coterminous with or over-laps the nulled object, or that portion of the nulled object that is to be transparatized. The term "interpose" does not imply any specific physical connection between the IDD and the nulled object. As described below, an interposed IDD may be mounted on the nulled object, or integrated into the structure of the nulled object, or may physically stand-alone independent of the nulled object.

"Replacement ikon"—an ikon that is displayed by a second IDD such that the ikon replaces a view that is blocked by a first IDD.

Nature of the Problem Solved by the Invention.

To the extent that the visual cues that render an object visible to a viewer can be nulled or circumvented, that object will cease to appear in the viewer's field of vision and will become "invisible" to the viewer. Opacity is the major visual cue that renders an object visible. Opacity occurs when photons originating from a direct or reflected source on the viewer-distal side of an object are absorbed or reflected by the object, thus preventing the photons from reaching the viewer's retina. In other words, the object intercepts or diverts photons representing a portion of the background, and thereby prevents the occluded portion of the entire background image from reaching the retina. This opacity thus results in a visual discontinuity in the background, and this discontinuity produces an outline of the object against the disrupted background. Because an occluded background ikon (OBI), as described in detail below, is a data representation of the occluded part of the background, to the extent that the OBI can be determined, acquired, and displayed to the viewer from the viewer-proximal surface of the nulled object, opacity can be, in a sense, circumvented, because the nulled object will be cloaked by the OBI and the viewer will see the OBI instead of the nulled object.

Secondary visual cues that must also be overcome in transparatizing an object include 1) light reflected off of the object and 2) shadows, both shadows cast by the object and incident shadows falling on the object. The invention disclosed herein also mitigates these factors, as disclosed below, and further reduces the visibility of the nulled object.

There are many situations in which it is desirable to minimize or eliminate the visibility of an object. For example, there is a problem common to many urban regions in that scenic vistas are typically blocked by large buildings, watertanks, and various types of "visual pollution." For instance, the downtown area of Vancouver, British Columbia, Canada has a beautiful mountain vista to the north across a scenic bay. However, numerous tall buildings have been built on the waterfront, and these buildings block the scenic view from all but those who occupy the occluding structures and have a window-view to the north, or pedestrians who occupy walkways between the buildings and the waterfront. It would be most desirable to provide a means for making such vistas visibly accessible to most or all of the population in spite of the obstructing structures, which is what the present invention does.

Another application of the invention is camouflage. Existing approaches to camouflage provide clothing or other types of coverings having a fixed visual pattern approximating an ideal or anticipated background. The "perfect" camouflage would be a visual pattern that is precisely continuous with the visible background. The problem with existing camouflage is that it must be a fixed visual pattern and therefore cannot anticipate all possible background patterns, much less be continuous with the visible background in any given situation. And even if a perfect match could be acquired between a camouflage surface and the OBI, as soon as the camouflaged object moves with respect to the background, or the background (or something in it) moves with respect to the object, the camouflage effect would be destroyed. In other words, visual cues are, for the most part, dynamic. If one wishes to reproduce those dynamic cues, one must be able to produce a dynamic camouflage, which is what the present invention does.

Related Art

The "science" of "invisibility cloaking" is largely restricted to SciFi novels, Star Trek re-runs, Disneyland exhibits, and Harry Potter movies. However, recently a modest number of academic programs have reported "theoretical success" in computer simulated invisibility of a type. For instance, Sebastien Guenneau, at the University of Liverpool, UK, in collaboration with Frederic Zolla and Andre Nicolet at the University of Marseille, FR, have reported encouraging results from computer modeling of bending light around objects using "metamaterials." Also, John Pendry of Imperial College London with David Schrig from Duke University, USA, have claimed experimental success in microwave "cloaking," in which metamaterials are used to partially bend microwaves around an object. However, these advances, as impressive as they may be theoretically, have little or no immediate application to producing invisibility with respect to visible light.

BRIEF SUMMARY OF THE INVENTION

The problem solved by the present invention is how to produce an illusion that a viewer's field of vision does not contain an object that is actually present in the field of vision. In other words, the problem is how to eliminate or mitigate the visual cues that are processed by a visual system to indicate the presence of an object. In providing a solution to this problem the present invention provides a system and method for reducing or eliminating the visual cues produced by an object, thereby endowing the object with faux-transparency.

Briefly, the invention involves means and methods for 1) acquiring a background ikon with respect to a nulled object relative to a viewer, 3) processing and editing the background ikon to produce an OBI, and 2) projecting the OBI from or onto the viewer-proximal surface of the nulled object such that the viewer sees the projected OBI instead of the nulled object.

More specifically, the invention produces a faux-transparency in the following manner. A background ikon is acquired with respect to a viewer and the object being transparatized. An OBI is calculated or determined empirically. This step may involve, depending on the application, determining the position of the viewer relative to the nulled object, calculating the visual field angles of the viewer with respect to the nulled object and the background, and applying the results of those calculations to determine the virtual borders of the OBI in the total background. The OBI is projected from or onto the viewer-proximal surface of the object by an IDD such that, from the perspective of the viewer, the background appears uninterrupted by the nulled object, because the viewer sees the OBI and not the nulled object.

BRIEF DESCRIPTION OF THE DRAWINGS

In the drawings identical reference numbers are employed to identify identical elements. The sizes and relative positions of the elements in the drawings are not necessarily to scale. For example, thicknesses are not drawn to scale and are enlarged to insure comprehension of the drawings.

DETAILED DESCRIPTION OF THE INVENTION

Figure 1:
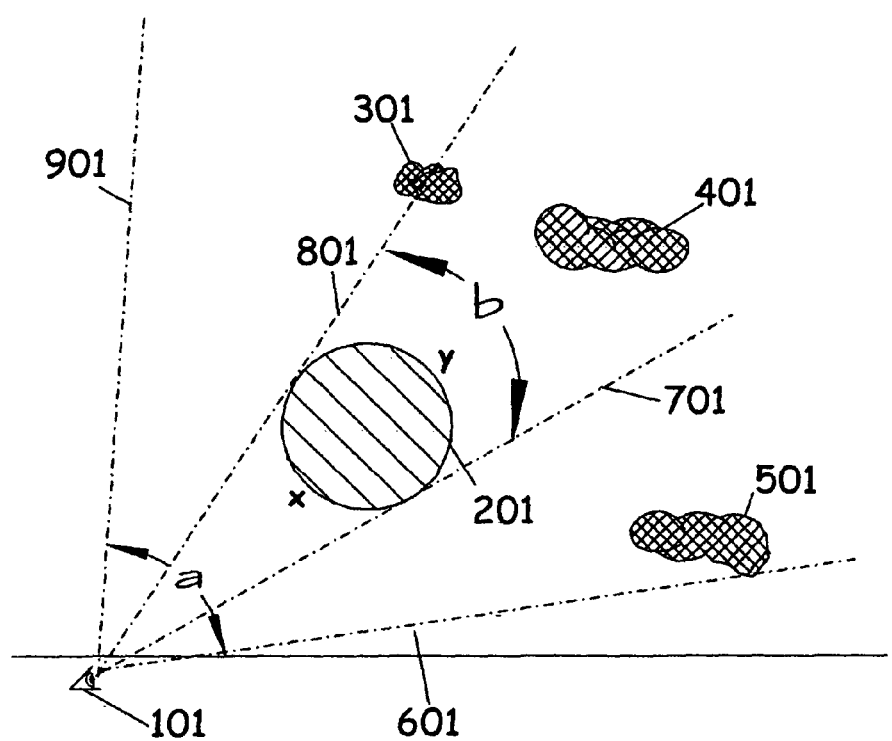
FIG. 1 is a summary drawing to illustrate the use of certain terms, and has been discussed above.

The inventive concepts and novel features of the invention are described herein with reference to specific embodiments of the invention, which embodiments collectively represent the best mode currently known to me for making, using, and practicing the invention. The steps and elements of the invention, and their structural and functional relationships, may be easily comprehended by referring to the figures and this disclosure. It is to be noted that the embodiments described herein are representative of many possible embodiments that incorporate the inventive concepts of my invention. The system and method disclosed and claimed herein have very broad applications, as will be understood upon a careful consideration of these disclosures. No single combination of the elements disclosed herein is optimal for all applications. Consequently, although the embodiments disclosed herein represent the best modes known to me for making and using the invention within the contexts of the various applications described, many other useful embodiments will become obvious to those skilled in the various relevant arts after reading and comprehending these disclosures.

Technologies for acquiring ikons, for editing ikons, for manipulating ikons, and for displaying ikons in a large-format display are advancing at a rapid rate. Given the disclosures made herein, those skilled in the such technologies will be able to apply a variety of approaches currently existing and yet to be developed in carrying out the method of this invention without going beyond the scope of the claims.

Ikon Display Device ("IDD")

The preferred IDD depends upon the given application of the invention. For large nulled objects the preferred display means will be a large-scale video display ("LsVD") comprising a plurality of video panels arranged in a matrix so that each panel displays one picture element, or "pixel," of the digitized ikon representing the OBI. Smaller nulled objects such as land vehicles accommodate single screen small-scale video displays (SsVD).

The technologies for implementing LsVD's are fairly diverse and are currently in a state of flux; consequently, the scope of the invention is not limited by the presently available devices. An early example of LsVD devices includes video displays commonly used in sporting and public events, often referred to generically as "jumbotrons." The word "JUMBOTRON®" is registered as a trademark with the U.S. Patent and Trademark Office by Sony, Inc. The Sony JUMBOTRON® employs vacuum fluorescent display technology to produce LsVD's.

LED LsVD's commonly comprise individual panels or modules to create the overall desired shape. A module represents a pixel, or picture element. The resolution of these large displays is affected by the type of video input, the processing means for processing the ikon and addressing the pixels, and the "pixel pitch," which refers to the distance between pixels. Such LED displays can produce trillions of color hues and produce an angle of projection approaching 180 degrees. LED LsVD's are preferred for large-scale applications of this invention.

Currently, the largest LsVDs are high-definition LED devices of over 7000 square feet. For instance the "Godzillatron" manufactured by Daktronics and installed at the University of Texas, Austin, Tex., USA, is 55 ft by 134 ft., or 7370 square feet. Examples of the technology currently employed to produce LsVDs include U.S. Pat. No. 5,469,187 LARGE SCALE ELECTRONIC DISPLAY SYSTEM to Zvi Yaniv and U.S. Pat. No. 5,693,170 TILED PANEL DISPLAY ASSEMBLY to Li.

One preferred approach is disclosed by U.S. Pat. No. 6,819,303 CONTROL SYSTEM FOR AND ELECTRONIC SIGN (VIDEO DISPLAY SYSTEM) to Berger et al., which discloses a process for generating data to switch a display light driver for an LsVD. The Berger patent discloses the use of a personal computer that acquires a video image and outputs digital display data that correspond to the pixels (or panels) of an LsVD. Berger also discloses a video link controller for converting the digital data into control signals for controlling the pixels. As these and other prior art references in the field make clear, the technology of LsVD's is evolving rapidly, and it is now sufficiently advanced that it can be applied to the producing large-scale faux-transparency, as described herein.

One particularly important advantage of using a module matrix with respect to the current invention is that when the nulled object is large and has a curved surface, the modular approach is amenable to displaying a smooth and complete ikon from the surface. Such a large scale curved video surface has been implemented commercially, for instance, the Daktronics' marquee for the Grand Lisboa Casino and Hotel in Macau.

For smaller objects that are to be transparatized, and especially smaller objects having flat surfaces, the invention may be optionally implemented with a SsVD. SsVDs are generally surface-mounted flat panels in which red, green, and blue diodes are mounted on a single chip set. By contrast, LsVDs used as out-door displays may employ discrete LED arrays having a cluster of individually mounted green, red, and blue diodes form a full color panel. U.S. Pat. No. 4,980,774 MODULAR FLAT-SCREEN TELEVISION DISPLAYS AND MODULES AND CIRCUIT DRIVES THEREFORE to Brody describes flat-screen devices wherein modules are individually addressable by a computer, which controls the wavelength and intensity of the light produced by the panel. The modules may be emissive, reflective, or transmissive.

Whether a single panel or a panel-matrix is used is not a distinguishing or limiting characteristic of the IDD of this invention. At the present time the technology of single panel video display is progressing to the point that panels of greater than one square meter are commercially available. In the foreseeable future, single video panels of multiple orders of magnitude greater in size are likely to exist, and may be suitable for the IDD means of the present invention. In addition, video display films or flexible sheets are being developed that may be easily adapted to fulfill the functions of the IDD described herein as those devices become readily available.

Consequently, there are a number of known means for effectuating an IDD of the type preferred for implementing the present invention. The choice will depend on the technology available, the size of the nulled object, the ambient conditions, and other details of the precise situation in which the invention is employed.

Ikon Acquisition Device ("IAD")

In order to produce the faux-transparency of the present invention, it is necessary to acquire an ikon of the obstructed background, which ikon can be edited and then projected from or onto the viewer-proximal side of the nulled object. The acquisition of the ikon is effectuated by one or more cameras fitted with the necessary lens and focusing devices, collectively referred to herein as the "ikon acquisition device".

Although LsVD's driven by analog video inputs are known in the art and can be used in the invention, the presently preferred embodiment is to acquire the ikon initially in digital format. DVD, QuickTime, MPEG-4, VHS and Betamax are examples of the types of digital and analog video format that are considered within the scope of the invention. The choice of equipment and formats are design problems that are to be resolved with respect to available resources and individual needs and design parameters. All still-image or video formats are within the scope of invention so long as they are capable of being processed as required and displayed in a sufficiently large scale format to meet the objectives of the invention.

It is generally desirable to obtain wide-angle ikons of the total background, particularly with the recent advance in IDD technology of wide-angle, high resolution LsVDs, such as the Smartvision® LED screens produced by ANC Sports, Inc.

Consequently, the use of readily available fish-eye camera lenses, which have a 360° field of view defined by a plane that is tangent to the camera lens, is preferred. Since only one camera is required in order to capture the entire background in a given direction, fewer background ikons are required for processing in order to produce an OBI for presentation. However, alternative and equivalent approaches exist. For instance, linking multiple cameras to produce the requisite background ikon from images that are digitally "stitched together."

Ikon Computation and Editing ("ICE")

Ikon computation and editing ("ICE") are provided in combination with the IAD and IDD. Means for carrying out ICE comprises one or more computers adapted to 1) compute the portion of an overall background that will constitute an OBI with respect to a viewer, 2) acquire as input from the IAD a digital or analog video or still-image ikon of an obscured background, 3) crop, re-size, and otherwise edit a still or video ikon into an OBI for displaying, and 4) output the edited OBI to the IDD.

In some low-demand applications it may be sufficient simply to acquire a generalized background ikon and display that ikon by the IDD without computing an OBI. For instance, where the background is homogeneous—such as if all of the clouds were removed from FIG. 1 and only a blue sky remained—it is not necessary to compute a precise OBI. Or it may be sufficient, particularly where camouflage is not an issue, merely to display an unedited background ikon from the IDD. In the former case, it may be sufficient to simply assess the chroma and brightness of the background sky and produce a display ikon calculated to have comparable chroma and brightness to the intended viewer. In the later case it may be sufficient to acquire the background image and display it from the IDD with little or no editing.

However, in most applications of the invention it will be desirable to more precisely dissect an OBI out of a complex background so that the OBI accurately duplicates that portion of the background that is being hidden from the viewer by the nulled object. This can be problematic, particularly when the background image constantly changes as 1) the nulled object moves across the background with respect to the viewer, 2) mobile entities in the background move with respect to the nulled object, and/or 3) the viewer moves with respect to the nulled object and background. In addition, it is most desirable to determine the light intensity of the background and reproduce it in the displayed ikon a pixel-by-pixel basis to maximize the fidelity of the background.

Dynamic backgrounds require algorithms that edit the constantly changing ikons to produce a comparably changing OBI. A method for accomplishing this feat is disclosed below. The ikon editing means may be mounted on or carried by the object being transparatized, or it may be remote therefrom and communicate with the IDD by wireless signals or other suitable modes of communication.

Example 1

IDD Attached to the Nulled Object

Figure 2A:
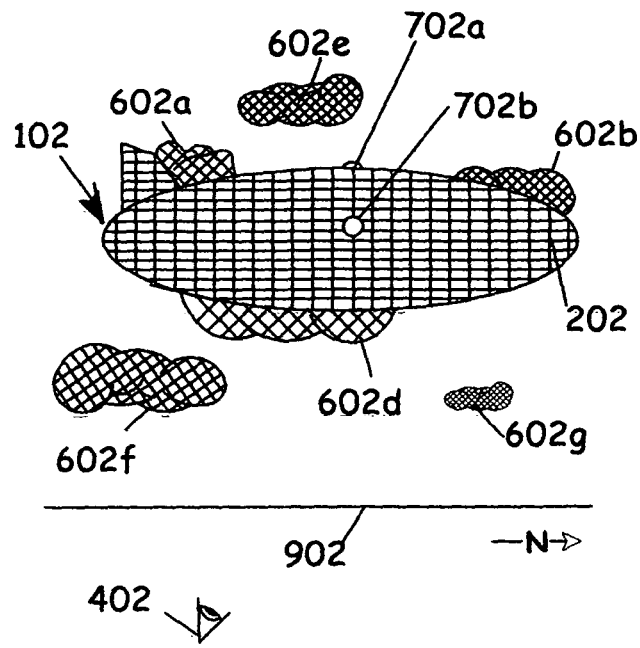
FIGS. 2A and 2B depict a side-elevation of the IDD deployed on a blimp. The invention is turned off in FIG. 2A. The invention is turned on in FIG. 2B.
Figure 2B:
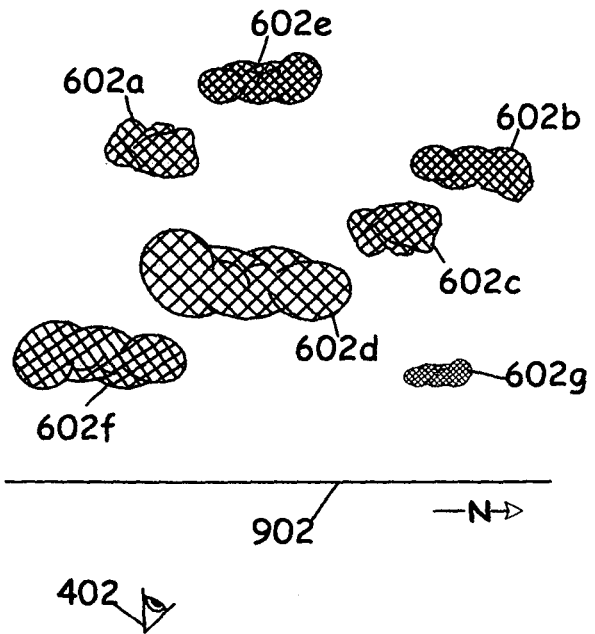

FIGS. 2A and 2B show an example of how the foregoing components are combined to produce faux-transparency of a vehicle, namely an aircraft, and more specifically, a blimp 102, which is airborne and in the medium distance with respect to a viewer 402. A horizon line 902 is provided for orientation. Also shown for orientation is the letter "N" indicating that the blimp is moving toward the north with viewer 402 looking to the west; therefore, the viewer-proximal side of the blimp is the east, or starboard, side of the blimp.

Also shown in FIGS. 2A and 2B are a plurality of entities in the sky to the west of the viewer—clouds 602a-602g. In FIG. 2A three of these clouds 602a,b, and d are partially obscured from the viewer's field of view by blimp 102. Cloud 602c is completely obscured from the viewer's view by the blimp.

In FIG. 2A, the faux-transparency device is turned off so that the blimp is visible to the viewer. An IDD 202 is attached to viewer-proximal side of the blimp 102. The IDD comprises an LsVD in the form of a matrix of video display modules. These modules, when activated and properly addressed with a video signal, are capable of displaying to viewer 402 the OBI, as described below. FIG. 2A shows the grid formed by the modules for illustrative purposes only. The grid is not visible to the viewer but rather the ikon is displayed as continuous and uninterrupted as a result of employing a sufficiently small pixel pitch.

In FIG. 2B, the invention is activated and is producing faux-transparency of the blimp. The faux-transparency is produced because the IDD 202 displays a precise representation of the OBI, including the occluded portions of clouds 602a, b, d, and all of occluded cloud 602c, in a manner to be described below.

Referring again to FIG. 2A, the IDD is provided in combination with an IAD, which comprises a plurality of cameras 702a, 702b, for acquiring one or more ikons to be displayed. In most applications, such as the one shown in FIG. 2A, the cameras are positioned on the nulled object, preferably on the viewer-distal surface; however, the cameras may be positioned anywhere from which they can acquire the proper background ikon.

In FIG. 2A two "fish-eye" lens cameras attached to the surface of the blimp are included as part of the IAD. The camera lens are not shown drawn to scale but are shown much larger relative to the blimp for ease of description. Camera 702a acquires an ikon of the sky directly above the blimp, which ikon will be displayed by IDD panels on the bottom of the blimp. Camera 702b acquires an ikon of the eastern sky that will be displayed by IDD panels on the port side of the blimp. At least one additional camera [not shown] is mounted on the viewer-distal side of the blimp where the camera acquires an ikon of the western sky, including the part of the western sky obscured by the blimp. This ikon of the western sky, once properly edited by the ICE, is the OBI that is displayed by the IDD mounted on the eastern, or viewer-proximal, side of the blimp so that it can be viewed by the viewer, thereby producing the effect seen in FIG. 2B of there being no blimp visible in the sky. For instance, cloud 602c, which is occluded by the blimp when the device is turned off (FIG. 2A) becomes visible when the invention is turned on (FIG. 2B). Likewise, assuming the OBI is a video or a rapidly refreshed sequence of still images, any object moving through the background will appear on the IDD, further promoting the faux-transparency effect.

Figure 3:
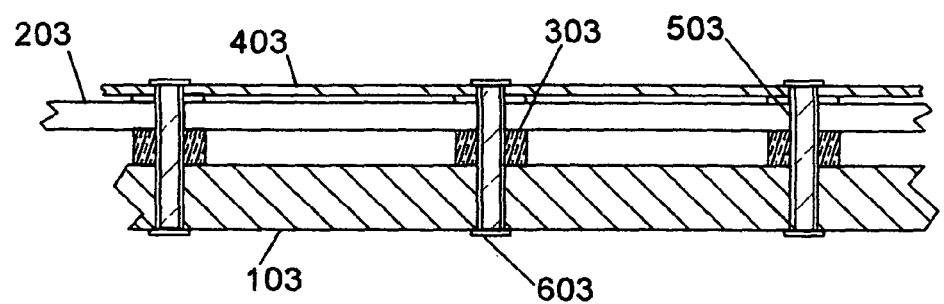
FIG. 3 is a cross-section of a surface of an object such as the blimp of FIG. 2, showing a preferred means of attaching the IDD thereto.

Typically, LsVDs are implemented as a matrix of individual video panels attached to a frame. In the example shown in FIG. 2A, such a frame is attached to the blimp 102 and the modular video panels are attached to the frame. FIG. 3 illustrates one way to effectuate such an attachment. FIG. 3 is a cross-section taken through the edge of a surface 103 of an object to which a LsVD is attached, for instance the blimp of FIG. 2A. Video module panels 203 are preferably of a flat type such as liquid crystalline display modules, commonly used in the art of LsVD. Such panels typically have a thickness not exceeding one or two centimeters. A frame comprising spacer-rails 503 is attached to the surface 103 by means of rivets 603 or other suitable attachment means. The flat video modules 203 fit between adjacent spacer-rails. Cushioning spacers 303 are provided to moderate the flexibility of the overall frame structure, and to protect the modules. A plurality of protective panels 403 are provided to protect the outer surfaces of the modules and to hold the modules in place. These panels may also function as light diffusers to reduce optical artifacts.

Example 2

Stand-Alone IDD

In many applications, such as shown in FIGS. 2A and 2B, it is most desirable to interpose the OBI between the nulled object and the viewer by physically attaching the IDD to the viewer-proximal surface of the nulled object. In other applications it is desirable for the IDD to stand alone between the nulled object and the viewer. In yet other applications, the IDD is integrated into the structure of the nulled object. Each of these options is considered herein as a means of interposing the IDD between the nulled object and the viewer.

Figure 4:
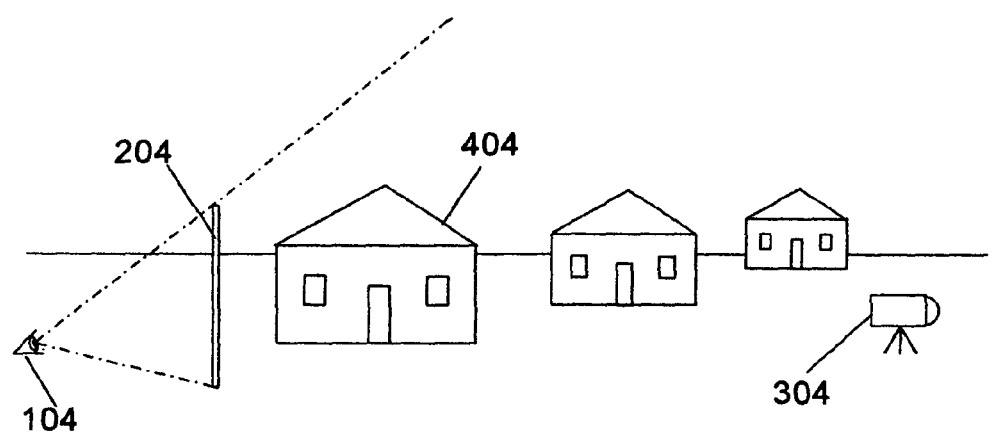
FIG. 4 is a perspective schematic showing a stand-alone embodiment of the IDD cloaking a plurality of buildings.

Given the large, and growing, display areas that LsVD's are capable of achieving, it is both possible and practical to use the invention to transparatize significant portions of a landscape, including a plurality of buildings. FIG. 4 shows an application of the invention in which the IDD is not attached to or incorporated in the nulled object but is erected as a stand-alone IDD. In such a situation, one or a plurality of objects 404 can be transparatized by placing the LsVD 204 between the viewer 104 and the objects. In the example shown in FIG. 4, the IAD, camera 304, is not attached to the nulled objects, but rather is positioned anywhere necessary so as to acquire the ikon required to produce the desired OBI.

Example 3

Stacked IDDs

Figure 5:
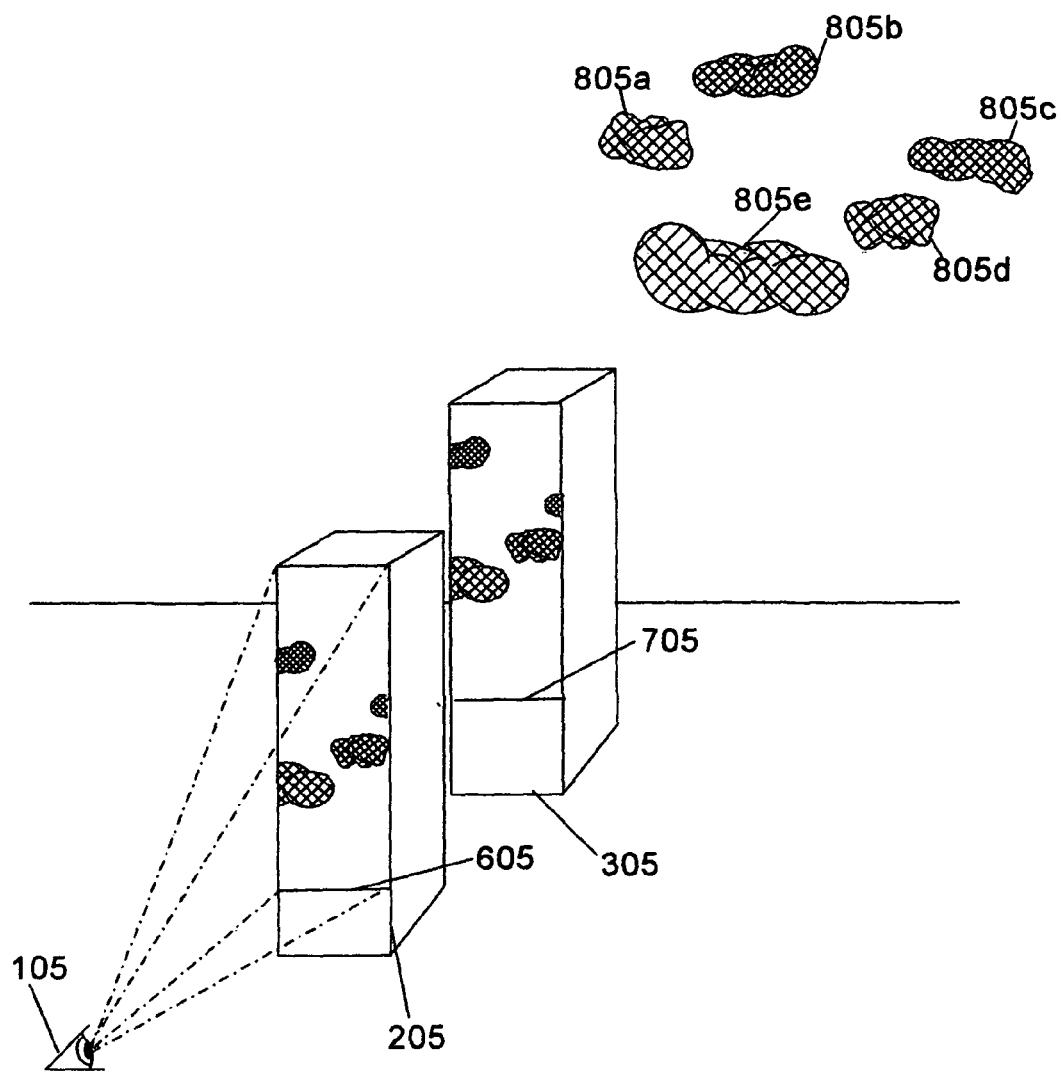
FIG. 5 is a perspective drawing showing the use of the invention to cloak two object simultaneously in a stacked configuration.

FIG. 5 demonstrates how the invention can be used to transparatize multiple levels of nulled objects. In this example, the view of viewer 105 to a vista that includes a plurality of entities 805a-e is blocked by a building 205 positioned between the vista and the viewer. Also positioned between the viewer and the vista is a second building 305. A first IDD 605 is attached to building 205; however, a first IAD (not shown) attached to the viewer-distal side of building 205 does not resolve the problem with respect to viewer 105 because the OBI that would be acquired by the IAD and displayed by IDD 605 would merely be an image of building 305 and not the vista. The invention resolves such difficulties in at least two ways.

The first way is to stack the IADs/IDDs in the sense that a second IDD 705 is attached to the viewer-proximal side of building 305 and a second IAD (not shown) is attached to the viewer-distal side of building 305. The second IAD acquires the OBI of the vista, which is displayed by the second IDD 705. Consequently, the first IAD, which is attached to the viewer-proximal side of building 205, acquires the OBI displayed by IDD 705. That ikon is then re-displayed by the first IDD 605. This embodiment is most useful in situations in which entities are likely to move between the two buildings because an entity moving between building 205 and building 305 will be captured on the first IAD device mounted on building 205 and that moving entity will be included in the OBI displayed by IDD 605.

In other situations a simpler approach will be possible, and that is eliminating the first IAD on building 205 and the second IDD mounted on building 305 and merely having the OBI that is acquired by the second IAD mounted on building 305 displayed by the first IDD 605 mounted on building 205. Although this approach is technically simple, it sacrifices significant reality if entities pass between the two buildings because those entities will not appear in the OBI displayed to the viewer.

An important point of this example illustrates that the IAD need not be mounted on the nulled object itself, but can be mounted anywhere from which an adequate ikon can be acquired in order to produce a realistic OBI.

Example 4

Shadow Cloaking

Figure 6A:
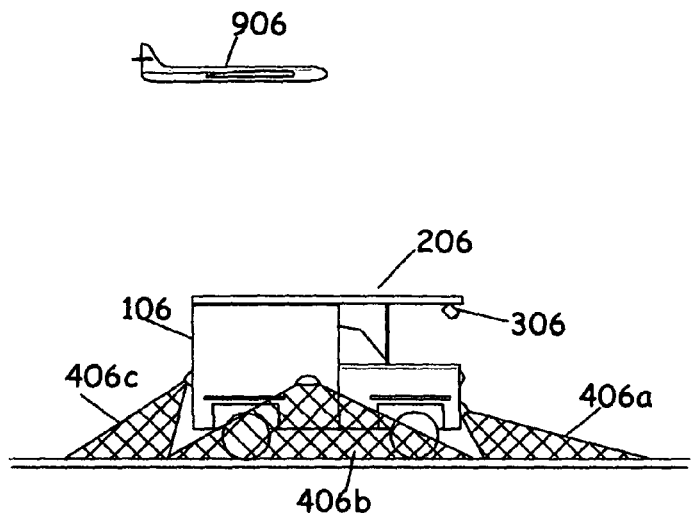
FIGS. 6A and 6B are side and top elevations of a truck employing the invention, including shadow mitigation effects.
Figure 6B:
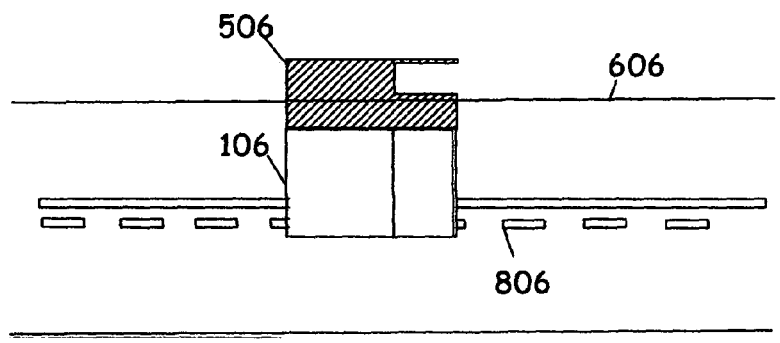
Figure 6C:
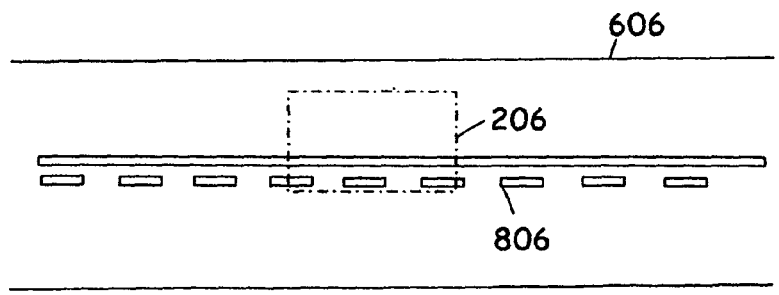
FIG. 6C is an aerial view looking down on the truck shown in FIGS. 6A and 6B during activation of the invention.

FIGS. 6A-6C demonstrate "shadow cloaking" to enhance the faux-transparency of an object that casts a shadow. As noted above, such shadows are visual cues that diminish the faux-transparency effect. In the present example an object on the ground is to be transparatized with respect to a viewer overhead. Transparatizing objects from overhead viewers is complicated by the fact that the shadows of objects on the ground are more evident to overhead viewers than to viewers on the ground. The example shows how these difficulties are overcome by the invention.

In FIG. 6A, a viewer in an aircraft 906 views a moving land vehicle 106 from above. An IDD 206 mounted on the vehicle displays an OBI towards the, sky. An IAD 306 is also mounted on the vehicle and is aimed to acquire an ikon of the road 606 in the direction of travel. The ikon that is acquired by the IAD is the portion of the road that the vehicle will occlude from the viewer after a period of time. By knowing the velocity of the vehicle, which is easily determined, the display of the OBI can be appropriately delayed by a display time delay period so that the displayed image is of the area of the road or ground beneath the vehicle as that area appeared just prior to being occluded by the vehicle. The proper delay period in displaying the ikon is easily computed by the ICE program simply by inputting the velocity of travel and the distance (d) in front of the vehicle of the area of the road or ground which comprises the ikon, which d is easily obtained from the angle at which the IAD 306 is pointed in the direction of travel. By waiting for a time substantially equal to the delay time period between acquiring the ikon and displaying it, the ikon when displayed will represent the road or ground the vehicle is over at the time of the display, but as that area appeared prior to being occluded by the vehicle.

The view that the airborne viewer would see when the device is inoperative is illustrated in FIG. 6B, which shows the vehicle 106 with IDD 206 on road 606 that has standard markings 806. The vehicle obscures the markings and throws a shadow 506 that is visible to viewer 906.

FIGS. 6A-C also illustrate how shadows 506 cast by the vehicle are cloaked by means of light-filling or "back-lighting" produced by lights 406*a-c* mounted on the exterior of the vehicle 106. By back-lighting the shadows and displaying a delayed OBI of the lighted road beneath the truck, as shown in FIG. 6C, the view that the airborne viewer 906 has is just the road 606 with its markings 806, some of which are displayed by IDD 206, thereby transparatizing the vehicle.

Example 5

Multiple Transparatized Surfaces

Figure 7:
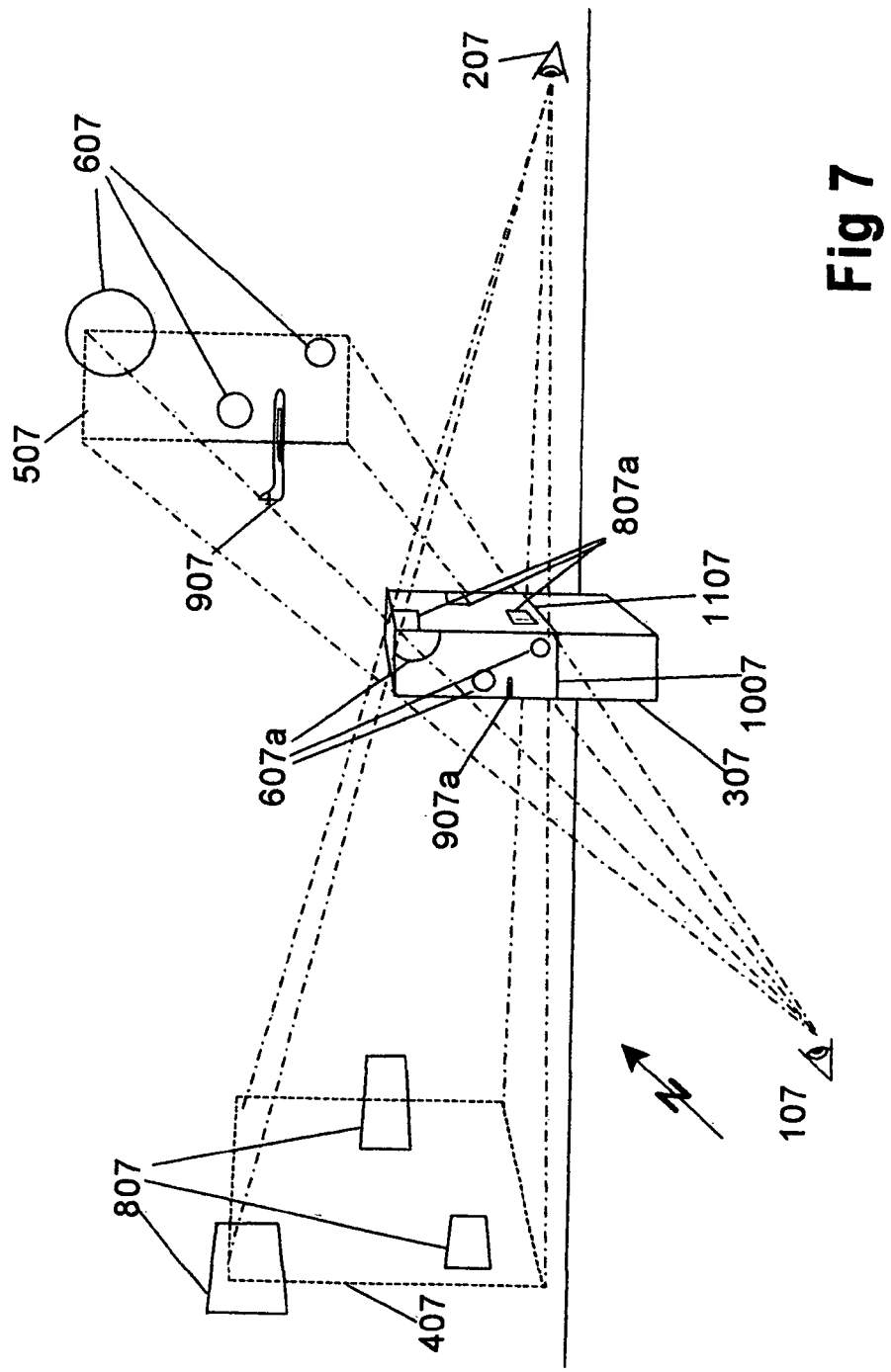
FIG. 7 is a perspective diagram of an object being transparatized on two sides.

FIG. 7 shows the use of the invention to transparatize a building 307 with respect to both a first viewer 107 and a second viewer 207. First viewer 107 is looking to the north; therefore, the southern side of building 307 is the viewer-proximal side with respect to viewer 107. Viewer 207 is looking to the west, viewing the eastern side of building 307, which is the viewer-proximal side of the building with respect to viewer 207. It is also to be noted that in this example, only the upper portion of building 307 is being transparatized with respect to the viewers, which illustrates the point that "transparatizing a building" does not necessarily require including the whole building.

Two LsVDs are mounted on the building to serve as IDDs. LsVD 1007 serves as the IDD for viewer 107; LsVD 1107 serves as the IDD for viewer 207.

It is obvious from FIG. 7 that the backgrounds, and hence the OBI's, with respect to each viewer are different. Projection lines are provided to indicate the two OBI's. OBI 507 obtains with respect to viewer 107. Within OBI 507 are a number of objects or portions of objects. Three of these objects are arbitrarily represented as circles 607. In addition, there is an aircraft 907, which is just entering the OBI. As a result of the calculations carried out by the ICE program, the OBI is appropriately cropped, zoomed, and displayed by LsVD 1007. Circles 607 are displayed as OBI circles 607*a*, and the aircraft 907 as 907*a*. As the aircraft moves across the background, the displayed OBI will show its movement until it emerges past the eastern edge of the nulled object 307.

Likewise, OBI 407 with respect to viewer 207 is appropriately cropped, zoomed, and displayed by LsVD 1107. OBI 407 contains objects labelled 807, which are displayed on the LsVD 1107 as objects 807*a*.

Not shown in FIG. 7 are the IAD's responsible for acquiring the background ikons. One digital video camera is mounted on the viewer distal, or northern, side of the nulled object 307 to acquire the OBI with respect to viewer 107. The other digital video camera is mounted on the western side of the nulled object, which is the viewer-distal side of the object with respect to viewer 207.

Determining of OBIs

The term "determining the OBI" refers to the process of determining the virtual boundaries of the obscured background such that when the ikon of the background acquired by the IAD is cropped to those boundaries and the resulting edited ikon is appropriately zoomed, the result will be an ikon that appears to be continuous with the visible background when the ikon is displayed by the IDD. There are many potential ways to determine an OBI; two preferred techniques are disclosed here.

Figure 8:
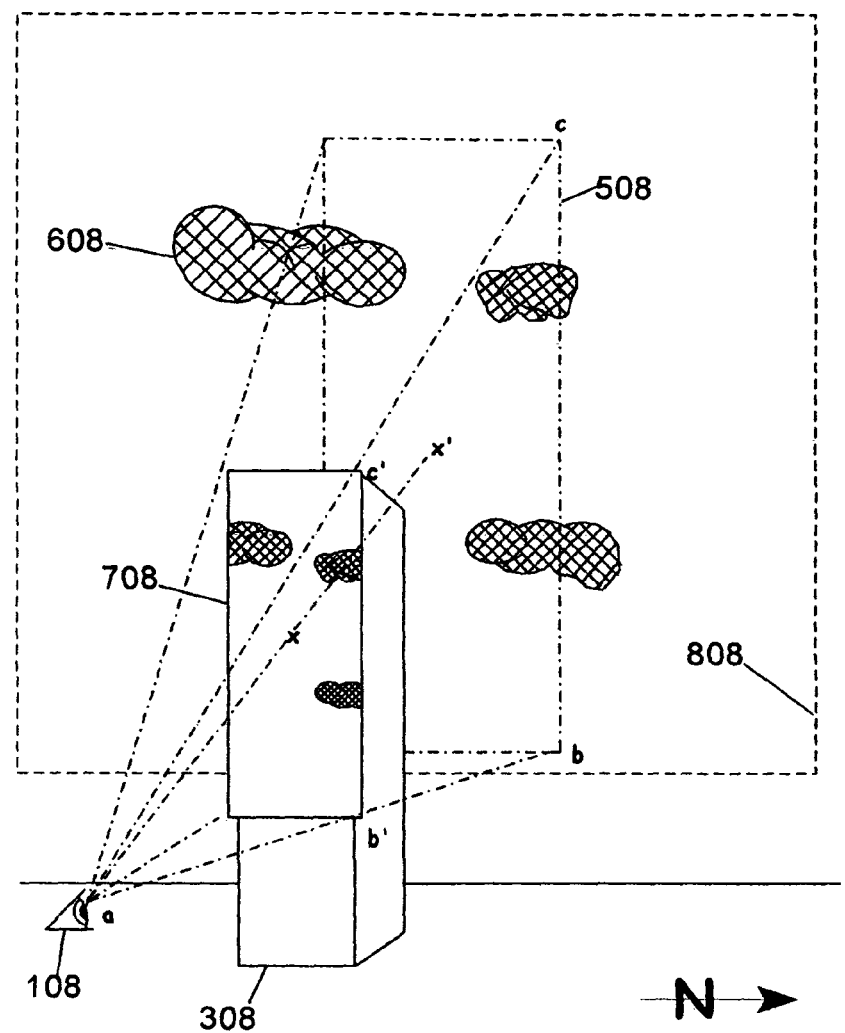
FIG. 8 is a schematic illustrating the trigonometric principles involved in calculating an OBI.

FIG. 8 illustrates a nulled object, building 308, that is partially transparatized by displaying an OBI from an IDD 708, which is attached to the eastern side of the building. Viewer 108 has a view toward the western sky, and that view is partially obscured by the building.

The IAD (not shown), which is located on the western side of building 308 can "see" a total background designated by square 808. The obstructed background with respect to viewer 108 is designated by the rectangle 508, which can be determined by extending projection lines from the viewer as shown, has the corners of the viewer-proximal side of the nulled object. The background contains a number of entities, some of which lie partially within the obscured portion of the background, for example 608. The goal is to acquire from the ikon of the total background, and ikon of rectangle 508, i.e., the OBI, which, when displayed by IDD 708 is substantially continuous with the visible background. In order to accomplish this goal, the total background 808, or a significant portion of it, is acquired as an image, cropped to the borders of 508 and the resultant image zoomed, appropriately for display. Alternatively, if the IAD itself is capable of being finely "tuned," it is possible to adjust the image it acquires so that it is restricted to the OBI, thereby eliminating the need to crop the ikon.

First, it is noted that because the obstructed backgrounds are specific to viewers looking at object 308 from different directions, a single IDD can transparatize object 308 only with respect to one direction of view at a time. The input parameters for the ICE program relate to a given viewer position, although the parameters allow for greater variability as the distance between the viewer and the nulled object increases.

What is required is to determine the boundaries of the OBI 508 and the "zoom factor," which means the magnification required of the image acquired by the IAD in order to display a realistically proportioned representation of 508. It will be obvious to those skilled in the arts of surveying and trigonometry that there are a number of known mathematical techniques for accomplishing this goal. For instance, referring to FIG. 8, x, which is the center of IDD 708, is easily determined by the intersection of diagonals. The center, x', of OBI 508, will lie on a straight line extrapolated from a through x Triangles ab'c' and abc are identical triangles. The lengths of lines ab', bc', and ac' are known, or easily determined. Estimates or measurements of the altitudes of representative objects in the OBI can be made, from which estimates of lines bc and b'c' can be derived to produce the zoom factor and boundaries, the horizontal boundaries being proportional to the vertical ones. As long as viewer position 108 relative to the IDD remains fixed, these calculations need not be performed only once. But if the viewer and IDD are moving with respect to each other, then dynamic, iterative calculations are required as described below.

Alternatively, an easy and accurate technique is to place an observer at the position occupied by 108 and adjust the OBI displayed by IDD 708 by trial and error until a satisfactory effect is obtained. The displayed OBI is adjusted simply by making adjustments to the parameters that are input to the ICE program; i.e., boundaries and zoom-factors. Alternatively one may simply adjust the lens of the IAD so that it acquires just the obstructed background. Once a satisfactory result is obtained, the IAD can be fixed so that the ikon acquired is precisely the OBI, which can then be mapped to the IDD pixels without repeatedly re-calculating the input parameters. This trial-and-error technique is most effective when the viewer positions are fixed, known, and limited. If the viewer is moving with respect to the nulled object, a dynamic trigonometric approach is preferred.

Figure 9:
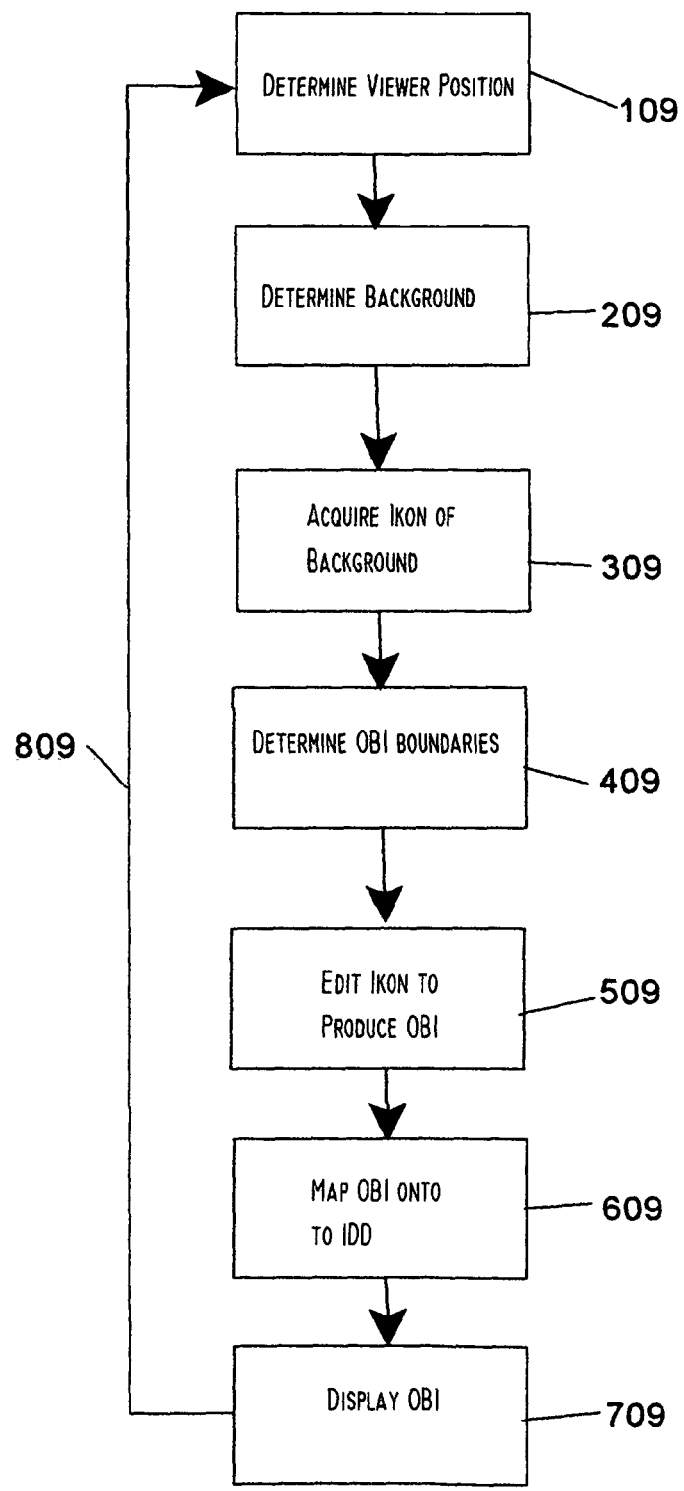
FIG. 9 is a flow chart of a preferred embodiment of the method of the invention.

FIG. 9 is a flow-chart of an example of steps that can be used to calculate and edit a background ikon to produce an OBI. The sequence shown in FIG. 9 is not necessarily optimal or appropriate for all circumstances, but from the present disclosure one skilled in the art will be able to modify the procedures and obtain good results with minimal experimentation.

In many cases it will be desirable to determine the position of the viewer relative to the IDD 109, both with respect to the angle and distance from the IDD. As noted above, these data can then be used to calculate the position and boundaries of the OBI. In other situations the position of the viewer will be fixed or will be amenable to presumptions that are strong enough to allow the OBI to be determined without precise knowledge of the viewer's position.

From the position of the viewer with respect to the nulled object, the background can then be determined 209. This is done most easily by extrapolating a straight line from the viewer through the center of the viewer-proximal surface of the nulled object to determine the direction in which the background lies.

An IAD is then employed to acquire the background ikon 309. Whether the ikon acquired is a still ikon, multiple sequential still ikons, or a video is determined by the objectives and resources of the user. The invention is amenable to any image/video technology or format. The acquisition step includes digitizing the ikon and passing it to a RAM location of an ICE computer for processing.

The OBI boundaries are then determined and digitally superimposed on the background ikon 409 Optionally, parameters such as luminosity and chroma of the background objects are determined and adjusted as necessary, taking into account that the viewer is much closer to the IDD than he is to the objects of the background.

The background ikon is then cropped to exclude all but the OBI 509. In most situations it will be necessary to re-size the OBI to the proper scale, thus a zoom factor is determined as discussed above.

The edited OBI is then mapped to the IDD 609 using software and techniques commonly used in the field. Luminosity and chroma are mapped on a pixel-by-pixel basis.

The OBI is displayed by the IDD. 709

As the viewer's position changes or the background changes, the process is repeated 809, preferably at a rate that is sufficient to equal to or greater than the human retinal flicker rate so that the image appears continuous.

Of course, in many situations the background will be homogenous and devoid of discrete entities, as when the background is an empty sky or a sky having even cloud cover. In such situations it is not necessary to calculate borders for an OBI. One simply measures the chroma and the luminosity of the sky in the background and uses those data to display an homogenous "empty sky ikon" from the IDD. In other cases, simply acquiring the background image will be sufficient to produce the aesthetic effect required, without calculating a precise OBI.

Viewer Locating Methods

In order to determine the OBI, it is not necessary to obtain absolute geographic coordinates of the viewer and/or the nulled object; all that is required is to know the viewer's position relative to the IDD. In some applications this distance will be fixed and easily determined, for instance, where viewers are limited in their movements relative to the IDD, such as when the nulled object is airborne and the viewers are located at a fixed position on the ground. In these situations, the distance between the viewer and the display device can be precisely calculated and re-calculated, or measured and re-measured, as the object moves relative to the viewer.

In other applications there will be many viewers positioned at various distances from the IDD. For instance, where a building on the edge of a harbor is being transparatized in order to provide visual access to the harbor, there may be thousands of viewers located both near to and far from the building. In such situations it is necessary to determine the OBI on the basis of a preferred distance chosen to provide the greatest effect for the maximum number of viewers. Once determined, the distance parameter input into the ICE program need not be changed.

In yet other situations more complex viewer locating procedures will be necessary because it will not be possible to pre-determine a fixed distance between viewer and IDD. For instance, where the nulled object is a ship, which is being transparatized with respect to a viewer-ship, the viewer-ship may move in an unpredictable manner with respect to the nulled ship. In such situations, it will be necessary to actively determine the instantaneous position of the viewer and determine the OBI accordingly. A number of range-finding technologies are presently available that are suitable for this task. For instance, radar, visual range-finders, IR range finders, and satellite-based systems can all produce distance data that are fed into the ICE program.

Referring again to FIG. 7, which relates to two distinct viewers, it can be seen that if there is just a single viewer moving from position 207 to position 107, and if that viewer's position is tracked by a viewer locating means, the OBI's that are displayed by multiple IDD's can be calculated so that the appropriate OBI is always presented to the viewer as he moves around the building.

Overcoming Secondary View Obstruction

Figure 10:
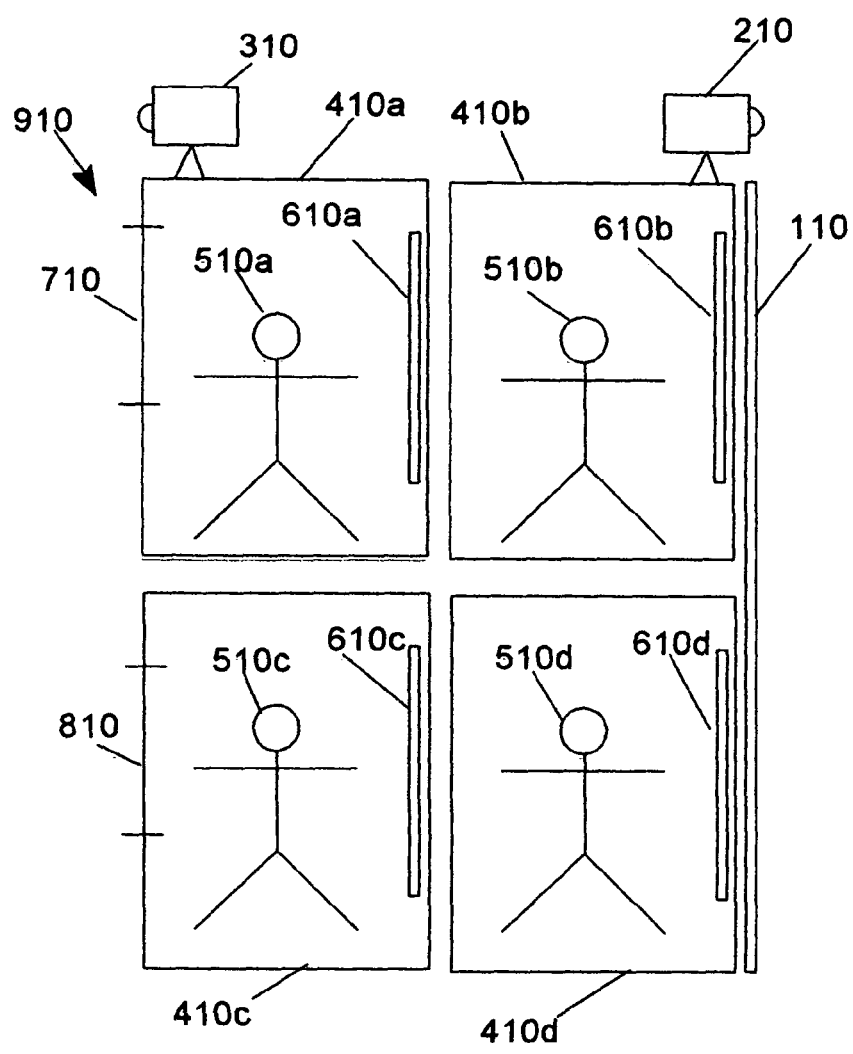
FIG. 10 and FIG. 11 are schematics illustrating the mitigation of secondary view obstruction problems in occupied buildings.

FIG. 10 represents a complicating situation in the practice of the invention. The figure shows a building comprising four rooms 410a-d. In each room there is a person 510a-d. An IDD 110 is mounted on the north side of the building. This is an LsVD that covers the entire north surface of the building. It receives an edited ikon, that is, an OBI, from IAD 310, which is facing south. The LsVD displays the ikon to the north in order to transparatize the building with respect to viewers north of the building.

Because the LsVD covers the entire north side of the building, persons 510b and 510d occupying rooms on the north side of the building cannot see through the LsVD; consequently, their rooms are blocked off from any view to the north and do not receive any light. Persons 510a and 510c in south-facing rooms on the other hand, have unobstructed windows 710 and 810, respectively, through which they can look south The invention overcomes the secondary view obstruction of persons 510b and 510d by providing small-scale video devices ("SsVD") 610b and 610d in place of windows. These SsVDs receive a video input from IAD 210, which is recording the view to the north. This input is referred to herein as a "replacement ikon." When the replacement ikon is displayed by the SsVDs, persons 510b and 510d are able to see the northern view just as if the IDD 110 was not attached to the building. Given the high-definition SsVD's currently available, persons 510b and 510d are unable to tell the difference from a real view through a window and the replacement ikon.

Because the replacement ikon presented to the persons inside the object is not a cloaking ikon but merely a panoramic or scenic ikon, it is not necessary to perform the sorts of computational steps required to transparatize an object. One is simply providing a digital window, and the replacement ikon can be more or less expansive than what the actual window view would have been. Furthermore, persons 510b and 510d can turn their IDDs off, adjust the brightness, or even change the view so that they receive views from other cameras, such as the view to the south acquired by IAD 310.

Figure 11:
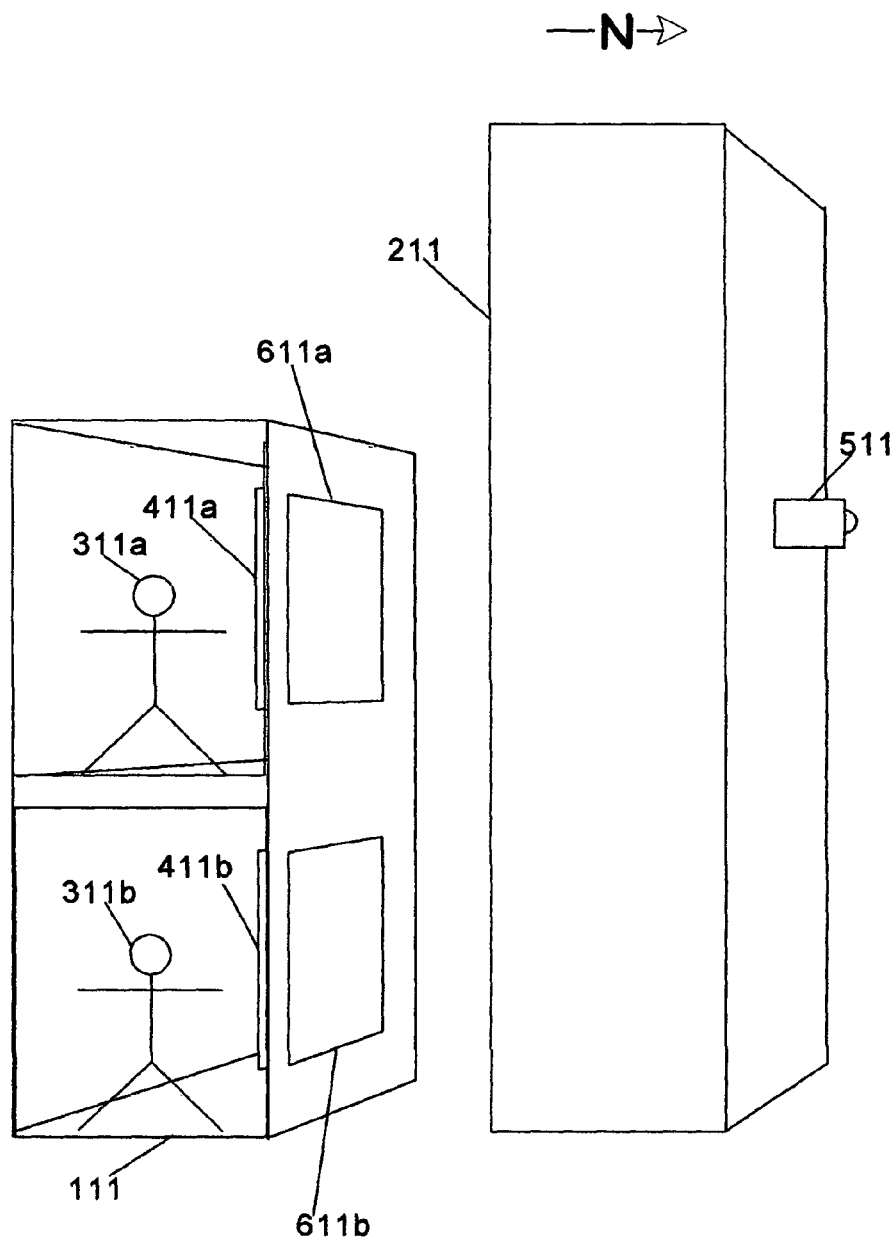

By simple extension of this feature and providing video leads from 210 and 310 to all rooms of the building, and by providing SsVDs that receive the video feeds, all of the occupants can enjoy views to either the north or the south view, or even an ikon from a camera that slowly rotates 360° to present a "moving window." It is thus possible to dispense with traditional glass windows entirely, which have many disadvantages of their own. For instance, FIG. 11 demonstrates an embodiment in incorporating a virtual window. Building 211 is between building 111 and a desirable northern view that cannot be seen by viewers 311a and 311b of building 111. The viewers are provided with IDDs 411a and 411b, which IDDs are interposed between the viewers and building 211 by mounting the IDDs on the viewers' walls and substantially covering windows 611a and 611b. At least one IAD 511 is provided to acquire an ikon of the desired northern view, which ikon is then displayed by the IDDs 411a and 411b to the viewers of building 111. The IDDs thus become virtual windows that replace the view that is blocked by the occluding building.

IDD Integrated into the Wall Structure.

The various embodiments disclosed above rely on IDDs that are either stand-alone or that are attached to the nulled object. These are favored approaches to retrofitting nulled objects with the invention. However, LCD panels have become sufficiently thin in recent years that an IDD can be easily integrated into the structure of the building during construction. Many urban buildings are currently built around a "glass and chrome" approach in which an entire side of a skyscraper appears as a sheet of uninterrupted glass. Similarly, the LCD panels that make up an LsVD can form the walls of a building, just as if they were sheets of glass. The approach has many benefits, not the least of which is that the individual panels and their controllers are easily accessible from inside the building for repair or replacement.

SUMMARY

The invention may be summarized, at least in part, by the following enumerated statements.

Statement 1: The invention comprises a method of producing faux-transparency in an object occluding a portion of a background from a first viewer's view, said method comprising the steps of:(1a) interposing a first image display device (IDD) between the first viewer and the object; (1b) acquiring a background ikon with an image acquisition device (IAD), wherein the background ikon includes the portion of the background that is occluded by the object; and, (1c) displaying from the first IDD of Step (1a) the background ikon acquired at Step (1b), whereby the first viewer sees the displayed background ikon instead of the object or some portion of the object.

Statement 2: The invention further comprises the method of Statement 1 wherein Step (1a) is performed by integrating the first IDD into the structure of the object.

Statement 3: The invention further comprises the method of Statement 1 wherein Step (1a) is performed by erecting the first IDD as a stand-alone IDD.

Statement 4: The invention further comprises the method of Statement 1 wherein Step (1a) is performed by mounting the IDD on the object.

Statement 5: The invention further comprises the method of Statement 1 further comprising the step of mounting the IAD on the viewer-distal side of the object.

Statement 6: The invention further comprises the method of Statement 1 further comprising the steps of: (6a) determining an occluded background ikon ("OBI"), wherein the OBI represents the portion of the background occluded from the first viewer's view by the object; and, (6b) editing the background ikon acquired at Step (1b) to produce the OBI determined at Step (6a), wherein the background ikon displayed at Step (1c)is the OBI.

Statement 7: The invention further comprises the method of Statement 6 wherein Step (6a) comprises the step of computing the virtual boundaries of the portion of the background that is occluded; and wherein Step (6b) comprises the step of cropping the background ikon to the virtual boundaries, whereby the OBI displayed at Step (1c) is continuous with the portion of the background not obscured from the first viewer's view by the object.

Statement 8: The invention further comprises the method of Statement 6 wherein Step (6a) comprises the step of determining the position of the first viewer relative to the IDD.

Statement 9: The invention further comprises the method of Statement 1 further comprising the step of adjusting the IAD so that the ikon it acquires at Step (1b) is an OBI, wherein the background ikon displayed at Step (1c) is the OBI.

Statement 10: The invention further comprises the method of Statement 1 further comprising the steps of: (10a) determining the luminosity of the background; and, (10b) adjusting the luminosity of the image displayed at Step (1c) to correspond with the luminosity determined at Step (10a).

Statement 11: The invention further comprises the method of Statement 1 wherein the ikon of Step (1b) is a static ikon.

Statement 12: The invention further comprises the method of Statement 11 wherein the static ikon is refreshed one or more times.

Statement 13: The invention further comprises the method of Statement 1 wherein the ikon displayed at Step (1c) is a video.

Statement 14: The invention further comprises the method of Statement 1 wherein the background ikon of Step (1b) is digital.

Statement 15: The invention further comprises the method of Statement 1 wherein a second viewer's view is blocked by the first IDD, the method further comprising the steps of: (15a) acquiring a replacement ikon that reproduces the view the second viewer would have but for the first IDD; (15b) interposing a second IDD between the first IDD and the second viewer; and, (15c) displaying the replacement ikon of Step (15a) from the second IDD, whereby the second viewer sees the replacement ikon instead of the first IDD.

Statement 16: The invention further comprises the method of Statement 1 further comprising the step of backlighting shadows cast by the object.

Statement 17: The invention further comprises a method of producing faux-transparency in a moving vehicle that occludes a portion of the ground or road from a viewer's view, the method comprising the steps of: (17a) interposing an image display device (IDD) between the viewer and the vehicle; (17b) acquiring an ikon with an image acquisition device (IAD), wherein the ikon represents an area of the ground or road immediately ahead of the vehicle that will be occluded from the viewer's view by the vehicle as the vehicle travels over the area; (17c) determining a display delay period, wherein the display delay period represents the amount of time that must pass before the ikon is displayed by the IDD in order for the ikon to represent the ground or road under the vehicle at the moment the ikon is displayed, but as the ground or road appeared before it was occluded by the vehicle; and, (17d) displaying from the IDD of Step (17a) the ikon acquired at Step (17b), wherein the amount of time between Step (17b) and Step (17e) is substantially the display time delay period of Step (17c), whereby the viewer sees the displayed ikon instead of the vehicle.

Statement 18: The invention further comprises the method of Statement 17 wherein Step (17c) comprises the steps of: (18a) determining the velocity of the vehicle; and, (18b) determining distance between the vehicle and the area.

Statement 19: The invention further comprises a device for producing faux-transparency in an object, said device comprising: 19a. a first ikon acquisition device (IAD) for acquiring an ikon of the background; 19b. a computer adapted to compute the virtual borders of the background obscured from the viewer's view by the portion of the object; 19c. a computer adapted to edit the acquired ikon to produce an obscured background ikon (OBI); and, 19d. a first ikon display device (IDD) for displaying the OBI, wherein said IDD is interposed between the viewer and the object so that the viewer sees the displayed OBI instead of the object.

Statement 20: The invention further comprises the device of Statement 19, wherein said first IDD blocks the view of a second viewer, said device further comprising: 20a. a second IAD for acquiring a replacement ikon of the view blocked by the first IDD; and, 20b. a second IDD for displaying the replacement ikon, wherein said second IDD is interposed between the second viewer and said first IDD; whereby the view blocked by the first IDD is displayed as the replacement ikon by the second IDD for viewing by the second viewer.

From the foregoing description the novelty, utility, means of constructing, and means of using my invention will be readily apprehended. However, the foregoing description merely represents the best mode known to me as of the present date. The embodiments herein disclosed are not meant to be exclusive of other ways of making and using my invention, and it will be obvious to those of average skill in the field that other means of producing and/or using the invention lie within the scope of this disclosure and the claims, below. Consequently, it is to be understood that my invention is not limited to the embodiments disclosed above but encompasses any and all embodiments within the scope of the following claims.

I claim:

1. A method of producing faux-transparency in an object occluding a portion of a background from a first viewer's view, said method comprising the steps of:
    (a) interposing a first image display device (IDD) between the first viewer and the object wherein said interposing is performed by integrating the first IDD into the structure of the object;
    (b) computing or otherwise determining that portion of the background that constitutes an occluded background ikon ("OBI") with respect to the viewer;
    (c) acquiring a background ikon with an image acquisition device (IAD), wherein the background ikon includes the portion of the background that is occluded by the object;
    (d) editing the background ikon acquired at Step (c) to produce the OBI; and,
    (e) displaying from the first IDD of Step (a) the OBI produced at Step (d), whereby the first viewer sees the displayed OBI instead of the object or some portion of the object.

2. A method of producing faux-transparency in an object occluding a portion of a background from a first viewer's view, said method comprising the steps of:
    (a) interposing a first image display device (IDD) between the first viewer and the object wherein said interposing is performed by erecting the first IDD as a stand-alone IDD;
    (b) computing or otherwise determining that portion of the background that constitutes an occluded background ikon ("OBI") with respect to the viewer;
    (c) acquiring a background ikon with an image acquisition device (IAD), wherein the background ikon includes the portion of the background that is occluded by the object;
    (d) editing the background ikon acquired at Step (c) to produce the OBI; and, (e) displaying from the first IDD of Step (a) the OBI produced at Step (d), whereby the first viewer sees the displayed OBI instead of the object or some portion of the object.

3. A method of producing faux-transparency in a moving vehicle that occludes a portion of the ground or road from a viewer's view, the method comprising the steps of:
(a) interposing an image display device (IDD) between the viewer and the vehicle;
(b) acquiring an ikon with an image acquisition device (IAD), wherein the ikon represents an area of the ground or road immediately ahead of the vehicle that will be occluded from the viewer's view by the vehicle as the vehicle travels over the area;
(c) determining a display delay period, wherein the display delay period represents the amount of time that must pass before the ikon is displayed by the IDD in order for the ikon to represent the ground or road under the vehicle at the moment the ikon is displayed, but as the ground or road appeared before it was occluded by the vehicle; and,
(d) displaying from the IDD of Step (a) the ikon acquired at Step (b),
wherein the amount of time between Step (b) and Step (d) is substantially the display delay period of Step (c), whereby the viewer sees the displayed ikon instead of the vehicle.

4. The method of claim 3 wherein Step (c) comprises the steps of:
(e) determining the velocity of the vehicle; and,
(f) determining distance between the vehicle and the area of Step (b).

5. A method of producing faux-transparency in an object that occludes a portion of a background from a first viewer's view, said method comprising the steps of:
(a) interposing a first image display device (IDD) between the first viewer and the object, wherein a second viewer's view is blocked by the first IDD;
(b) computing or otherwise determining that portion of the background that constitutes an occluded background ikon ("OBI") with respect to the first viewer;
(c) acquiring a background ikon with an image acquisition device (IAD), wherein the background ikon includes the portion of the background that is occluded by the object;
(d) editing the background ikon acquired at Step (c) to produce the OBI;
(e) displaying from the first IDD of Step (a) the OBI produced at Step (d);
(h) acquiring a replacement ikon that reproduces the view the second viewer would have but for the first IDD;
(j) interposing a second IDD between the first IDD and the second viewer; and,
(k) displaying the replacement ikon of Step (h) from the second IDD,
whereby the first viewer sees the displayed OBI instead of the object or some portion of the object, and
whereby the second viewer sees the replacement ikon instead of the first IDD.

6. A device for producing faux-transparency in an object that occludes a portion of a background from a first viewer's view, said device comprising:
a. a first ikon acquisition device (IAD) for acquiring an ikon of the background;
b. a computer adapted to compute virtual borders of the background obscured from a first view of a first viewer by a portion of the object;
c. a computer adapted to edit the acquired ikon to produce an occluded background ikon (OBI);
d. a first ikon display device (IDD) for displaying the OBI, wherein said IDD is interposed between the first viewer and the object so that the first viewer sees the displayed OBI instead of the object, and wherein said first IDD blocks a second view of a second viewer;
e. a second IAD for acquiring a replacement ikon of the second view blocked by the first IDD; and,
f. a second IDD for displaying the replacement ikon, wherein said second IDD is interposed between the second viewer and said first IDD,
whereby the first view blocked by the first IDD is displayed as the replacement ikon by the second IDD for viewing by the second viewer.

\* \* \* \* \*